A. E. CARTER.
COIL CLUTCH.
APPLICATION FILED JULY 29, 1916.

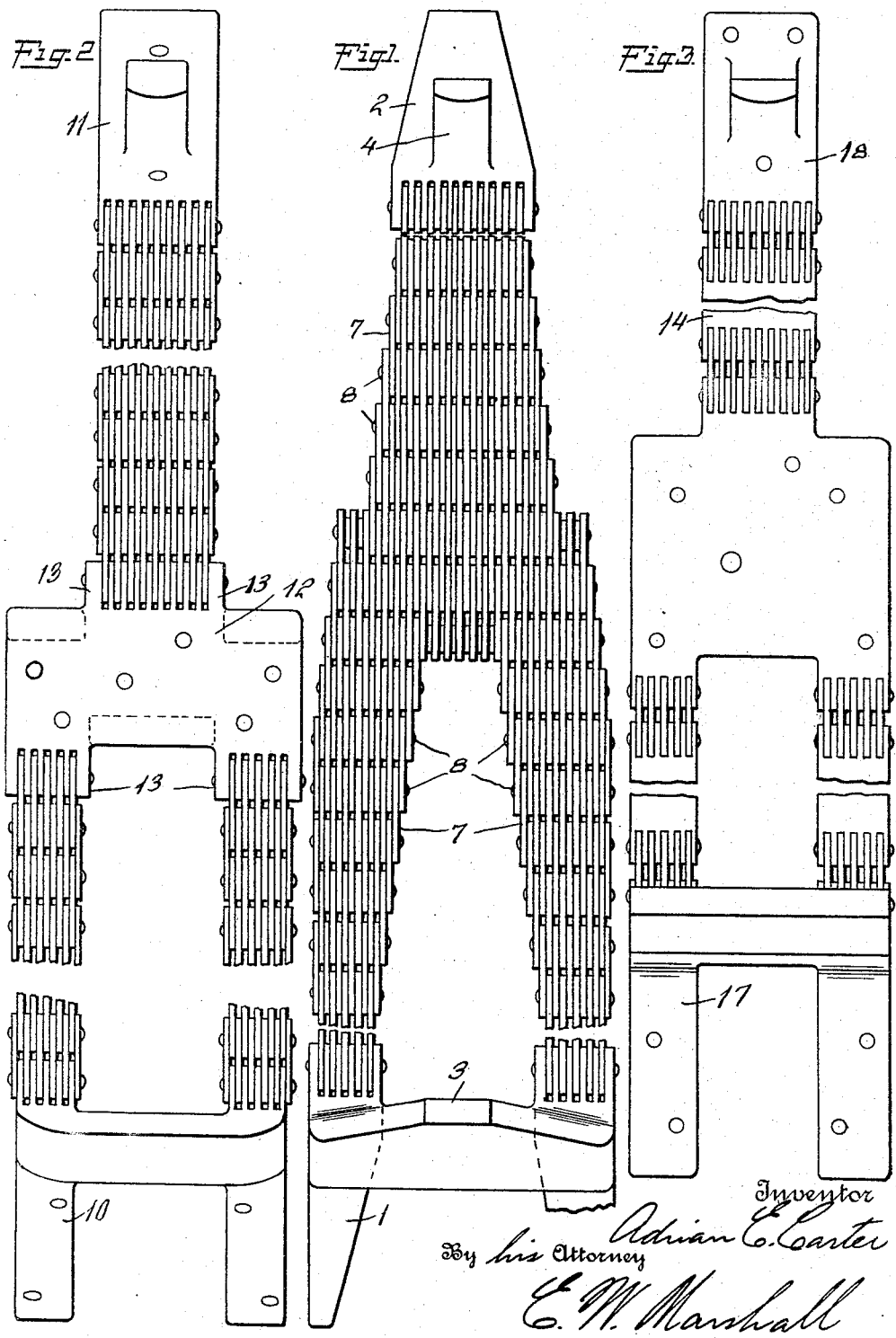

1,203,484.

Patented Oct. 31, 1916.
3 SHEETS—SHEET 2.

Inventor
Adrian E. Carter
By his Attorney
E. W. Marshall

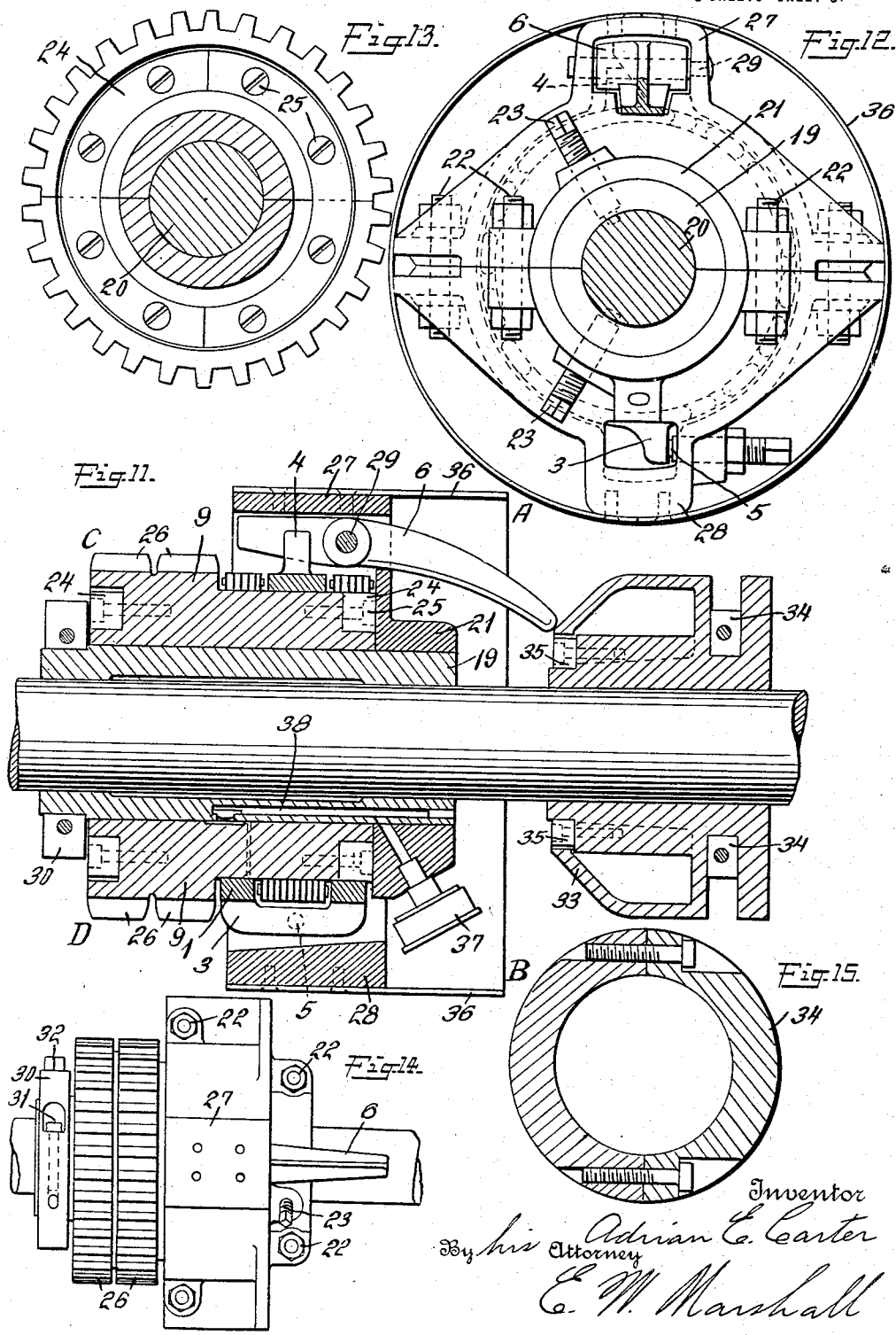

UNITED STATES PATENT OFFICE.

ADRIAN ETHELBERT CARTER, OF MANCHESTER, ENGLAND.

COIL-CLUTCH.

1,203,484.

Specification of Letters Patent.

Patented Oct. 31, 1916.

Application filed July 29, 1916. Serial No. 112,191.

*To all whom it may concern:*

Be it known that I, ADRIAN E. CARTER, a subject of the King of England, and residing at Manchester, England, have invented certain new and useful Improvements in Coil-Clutches, of which the following is a specification, reference being had to the accompanying drawings, forming a part thereof.

My invention relates to clutches and has special reference to such as are adapted for line shafting where chains or other positive transmission elements are employed which render the use of fixed and loose pulleys impossible.

One object of my invention is to provide a clutch of the friction coil type that shall be simple and durable in construction and arranged and adapted to be mounted at an intermediate point in a long shaft and to have the wearing parts easily and quickly replaced.

Another object is to provide a clutch that shall be particularly effective in operation and that shall embody a forked flexible member, such as, for example, a chain link construction, which is adapted to be wrapped tightly upon a friction drum when the clutch is actuated.

Another object is to provide a flexible shoe or coil adapted to form a part of the coil clutch.

In order that my invention may be thoroughly understood I will now proceed to describe the same in the following specification, and then point out the novel features thereof in appended claims.

Figure 4:
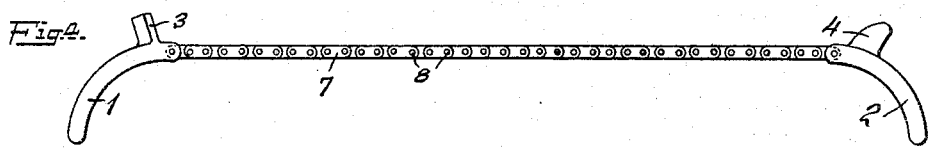
Figure 8:
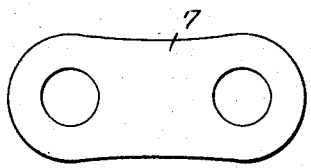
Figure 6:
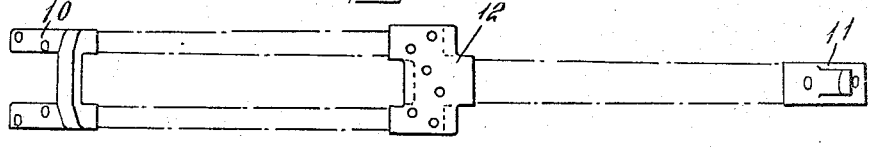
Figure 7:
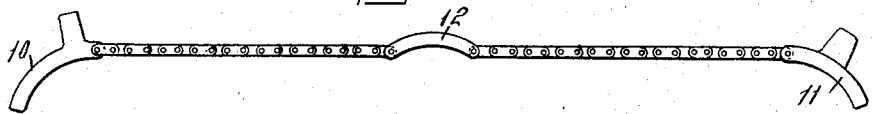
Figure 9:
Figure 10:
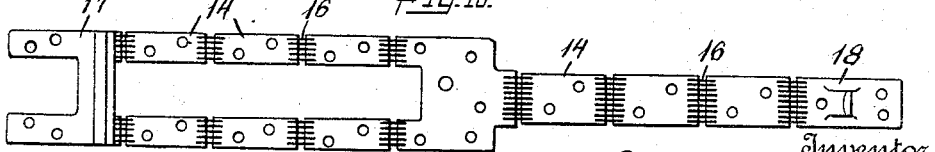

Referring to the drawings: Figures 1, 2 and 3 show extended but partly broken away, three forms of clutch coils constructed according to the invention. Fig. 4 is a side elevation, and Fig. 5 an outline plan view, of a complete chain coil of the type shown in Fig. 1. Fig. 6 is a detail of one of the links, drawn to a larger scale. Fig. 7 is a side view and Fig. 8 an outline plan view showing to a smaller scale a complete chain coil in accordance with Fig. 2. Fig. 9 is a side view and Fig. 10 a plan view showing to a smaller scale a complete clutch coil in accordance with Fig. 3. Fig. 11 shows a complete longitudinal section of a bobbin-operated clutch constructed according to the invention. Fig. 12 shows a section on the line A—B of Fig. 11 looking toward the left, but omitting the lubricator. Fig. 13 is a section on the line C—D of Fig. 11 looking toward the right. Fig. 14 is a plan view of the principal portion of the clutch but with its outer shell or casing omitted. Fig. 15 is a section of the two-part ring which connects the parts of the split bobbin around the shaft.

Figure 5:
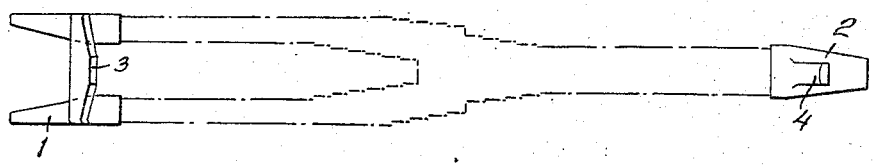

The clutch coil shown in Figs. 1, 4 and 5, has end pieces 1 and 2 curved to the shape of the drum or boss with which the clutch coil is to engage, the end piece 1 having a lug 3 for engaging with an adjustable abutment screw in the clutch case, while the end 2 has a lug 4 adapted to be engaged by the inclined face of the lever by which the clutch is applied. The adjustable abutment screw is shown at 5 in Fig. 12 and by a dotted circle in Fig. 11 engaging with the lug 3 while the lever 6 which engages with the lug 4 is seen in Fig. 11 and in dotted lines in Fig. 12. Apart from the end pieces 1 and 2, the clutch coil is built up entirely of chain links 7, connected together on the multiple-strand principle by studs 8. The tongue portion of the clutch coil at the right hand part in Fig. 5 merges into the fork portion by additional links and longer studs being used at the middle part as seen clearly in Fig. 1 until the middle part is opened out and two separate fork portions are left extending therefrom. By this gradual change from tongue to fork, undue bending stresses on the studs at the middle part are largely avoided and a very strong construction is provided. It will be apparent that the tongue portion of the clutch coil when wrapped around the boss 9 as in Figs. 11 and 12, passes under the lug 3 of the end piece 1, and lies between the two fork portions, the end piece 2 coming nearly up to the end of the gap between the fork portions. The links 7 of the chain are preferably all formed of elements such as are shown to a larger scale in Fig. 6. These may be punched from strip metal and fitted on simple cylindrical studs as shown, the ends of the studs being riveted over in the usual way. Preferably the edges of the links are formed to a curvature of the same radius as that of the clutch boss, as is also seen in Fig. 6, so that the edge surface of each link will from the start bear over a comparatively wide area on the clutch boss. If this were not done, however, the links would wear in time to this form. Both faces of the links are of the same form and the whole clutch coil is reversible when it is too much worn on one face to be safe or effective, it being only necessary to remove the end pieces 1 and 2 to reverse them on the chain coil, and then to apply it again in the reversed position. The coil, therefore, has in this way a double life, being used up on both faces before it needs replacing. The clutch coil shown in Figs. 2, 7 and 8, differ only from that shown in Figs. 1, 4 and 5, in that end pieces 10 and 11 are used of slightly different design, while the tongue portion and the fork portions are built up of chain links without any shouldering or tapering in the middle part, a junction or bridge piece 12 being used at that part, formed from a plate of the proper curvature and with notched lugs at its opposite sides to receive the links of the tongue and fork portions of the chain.

It is generally necessary to saw out the notches for the chain links to engage with, in the plate 12, and as the portions then left may not be as strong as the chain links, it is desirable for wider end pieces 13 to be left as shown clearly in Fig. 2, to receive the connecting studs, in order that the chain coil may not be unduly weak at its points of connection with the plate 12. It will be seen that each of the chain coils described is very flexible and provides an engaging surface which will withstand hard wear and heavy loads without detriment, while it is not subjected to any twisting or canting reactions. The chain links are not necessarily of the form shown, but wider links which might be termed "block links" could be used, although the narrower links shown have the advantage of avoiding any appreciable bending stresses on the studs. In the modification shown in Figs. 3, 9 and 10, some of the links of the clutch coil are replaced by plates 14 curved to the proper shape for fitting on the clutch boss, and they are shown as having linings 15 of ferodo or the like riveted thereto to provide a wearing surface. The plates 14 are connected together, however, by chain links 16 so that the coil is flexible at the joints and can be readily applied to and taken off the clutch boss without disconnecting any of the parts; the end pieces 17 and 18 carrying respectively the abutment lug which is engaged by the lever 6, differ merely in shape and not in function from the corresponding parts of the other clutch coils.

A lining of suitable frictional material may be applied to the clutch coils of Figs. 1 and 2 as well as to that of Fig. 3, in which case, for example, a strip of ferodo may be secured by staples to the links of the chain. By making the chain links, however, of suitable material for frictional engagement with the clutch boss, for example of mild steel or of bronze, it is possible to get such an effective clutch surface that the use of a lining of ferodo or the like with chain coils as shown in Figs. 1 and 2 should rarely be necessary.

The full advantage of using a clutch coil of the type set forth is only secured when the remaining parts of the clutch are also such that they can be applied to a shaft without gaining access to one end thereof. A suitable method of building up in halves and connecting together the parts of the clutch is indicated in Figs. 11 to 15. An iron bush 19 is bored to fit the line-shaft 20 and is forced into the end of a cast iron casing 21, which overhangs the bush; thereupon the bush and the casing are sawed through longitudinally, or otherwise split, so as to form two parts which can be applied to the shaft and clamped together thereon by bolts and nuts 22, as seen in Figs. 12 and 14. Set screws 23 passing through the end of the casing and the bush into recesses in the shaft key the clutch parts securely on the shaft. The clutch boss 9 is a turning fit on the bush 19 and is also made in two parts which are secured together at each end by split rings 24 with their split ends in a plane at right angles to that in which the boss is split. Fig. 13 shows how these rings are applied and secured by means of screws 25. In the example shown, the boss has chain wheel teeth 26 cut out thereon for engagement for example by a silent chain with central guide links, but instead thereof any other type of chain wheel or pulley might be formed on the boss 9.

The left hand end of the bush 19 is held together by a split clamping ring or collar 30, the parts of which are drawn together by screws 31, while a set screw 32, passing through the ring 30 into the bush 19, holds the ring in position thereon. The ring 30 also forms a stop preventing longitudinal movement of the clutch boss 9. The casing 21 has projections 27 and 28 at opposite sides thereof for receiving respectively the operating lever 6 and the inclined plane lug of the clutch coil on the one hand, and the adjustable abutment screw 5 with the abutment lug of the clutch coil on the other hand. The lever 6 is pivoted in the projection 27 on a cross pin 29, and its inclined face engages with the inclined plane lug 4, so as to apply the clutch coil in the well known manner. The lever 6 is operated by a bobbin 33 in the well known way, this bobbin being also split and secured to the shaft on the one hand by a split ring 34 shown in Fig. 15, and on the other hand by a split ring 35 held in the same way as the rings 24 shown in Fig. 13 are held. The bobbin is moved longitudinally on the shaft by a collar engaging in the groove around the split ring 34 in order to press outward the right hand end of lever 6 causing the inclined face at its left hand end to force back the inclined plane lug of the clutch coil and so to tighten the coil on the clutch boss 9, whereupon this clutch boss is coupled to the clutch casing 21 and through the same with the bush 19 and the shaft 20. When the bobbin is moved to the right so as to release the lever 6, its right hand end moves inwardly, while its left hand end moves outwardly allowing the clutch coil to disengage. The lever 6 may be pressed inwardly by a spring or its left hand end may be made of such a mass that centrifugal action will cause the left hand end to turn outwardly when free so to do. A split shield 36 may be secured to the outside of the casing as seen in Figs. 11 and 12 in order to inclose the clutch parts and to prevent windage and the throwing outwardly of lubricant. A lubricator of the Stauffer type is shown at 37 for supplying lubricant through a channel 38 to the interior of the clutch boss 9. This lubricator is omitted in Fig. 12, so that the lug 3 and abutment screw 5 may be clearly seen there.

From the above description it will be apparent that the clutch can be applied to and removed from a shaft wherever access is obtainable to a length thereof sufficient to accommodate the clutch parts. If the clutch coil requires attention, reversal of position and replacement and so forth at any time, it is only necessary to remove the split ring 30, whereupon the boss 9 can be slid outward toward the left so as to expose the clutch coil and to permit it to be taken off. When it is replaced the boss is pressed back again into position and the abutment screw 5 is adjusted afresh if necessary so that the normal movement of the lever 6 effected by the bobbin 33 will cause the clutch coil to engage tightly.

The invention is not limited to the use of clutch coils of the type set forth, which embrace the clutch boss only for about one and a half turns. The fork and tongue principle may be extended for example by the use of a bridge piece at the ends of the fork members, so as to carry additional fork members which will make another complete turn around the boss outside the existing fork member, the abutment lug being on the ends of the outer fork members in this case. This will require no illustration. It is preferable, however, as a rule to make it wider if required in the tongue and the fork when a greater bearing area is needed. Similarly the link plates 14, Fig. 3, would be made wider for a clutch transmitting more power. Although clutch coils have been referred to throughout the description, it will be obvious that the clutch member described will serve for braking purposes when required and wherever the term "clutch coil" is used in the specification and claims which follow, it may be assumed to cover a braking coil also.

Attention is directed to the fact that the forces applied to the actuating lugs with which the coil is provided are in the same plane, that is, the central plane of the friction drum, and accordingly there is no tendency for the coil to cant or twist. The coil therefore wears with particular uniformity over its entire surface.

What I claim is:

1. A clutch coil for a drum clutch comprising a flexible strip having a bifurcated or forked section at one end, a tongue section at the opposite end adapted to extend between the parts of the forked section and be wrapped upon the drum to provide more than a complete turn of the coil and rigid actuating lugs at its respective ends.

2. A clutch coil comprising a plurality of curved sections pivotally connected to each other and formed to provide a single tongue on one side of the center and a bifurcated or forked section on the other side of the center.

3. A clutch coil for a drum clutch comprising a flexible strip of link formation having a bifurcated or forked section at one end, a tongue section at the opposite end adapted to extend between the parts of the forked section and be wrapped upon the drum to provide more than a complete turn of the coil, and rigid actuating lugs at its respective ends.

4. A clutch coil comprising a flexible strip formed to provide a single tongue on one side of the center and a bifurcated or forked section on the other side of the center, and actuating lugs at its respective ends.

In witness whereof, I have hereunto set my hand this 13 day of July, 1916.

ADRIAN ETHELBERT CARTER.

Witnesses:
    Ernald Simpson Moseley,
    Marion Earl Cloud.

Copies of this patent may be obtained for five cents each, by addressing the "Commissioner of Patents, Washington, D. C."